United States Patent
Fukuoka et al.

(10) Patent No.: US 9,293,763 B2
(45) Date of Patent: Mar. 22, 2016

(54) SILICON OXIDE, MAKING METHOD, NEGATIVE ELECTRODE, LITHIUM ION SECONDARY BATTERY, AND ELECTROCHEMICAL CAPACITOR

(71) Applicant: Shin-Etsu Chemical Co., Ltd., Tokyo (JP)

(72) Inventors: Hirofumi Fukuoka, Annaka (JP); Mitsugu Saito, Annaka (JP); Susumu Ueno, Annaka (JP); Tetsuya Inukai, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 241 days.

(21) Appl. No.: 14/059,967

(22) Filed: Oct. 22, 2013

(65) Prior Publication Data

US 2014/0113192 A1    Apr. 24, 2014

(30) Foreign Application Priority Data

Oct. 23, 2012  (JP) .................. 2012-233972

(51) Int. Cl.
| | |
|---|---|
| *H01M 4/36* | (2006.01) |
| *H01M 4/48* | (2010.01) |
| *C01B 15/14* | (2006.01) |
| *C01B 33/113* | (2006.01) |
| *H01G 11/50* | (2013.01) |
| *H01M 4/485* | (2010.01) |
| *H01M 4/38* | (2006.01) |
| *H01M 4/62* | (2006.01) |
| *H01G 11/46* | (2013.01) |
| *H01M 10/0525* | (2010.01) |

(Continued)

(52) U.S. Cl.
CPC ............. *H01M 4/364* (2013.01); *C01B 33/113* (2013.01); *H01G 11/46* (2013.01); *H01G 11/50* (2013.01); *H01M 4/386* (2013.01); *H01M 4/485* (2013.01); *H01M 4/62* (2013.01); *H01G 11/06* (2013.01); *H01M 10/0525* (2013.01); *H01M 2004/021* (2013.01); *Y02E 60/122* (2013.01); *Y02E 60/13* (2013.01)

(58) Field of Classification Search
CPC ..... H01M 4/485; H01M 4/48; H01M 4/0471; H01M 4/131; H01M 10/0525; C01B 33/00; C01B 33/113; C09C 1/0018
See application file for complete search history.

(56) References Cited

U.S. PATENT DOCUMENTS 3,667,909 A * 6/1972 Thomas ............... C01B 33/163
                                                                  423/325
4,956,059 A * 9/1990 Englisch ............... B01J 19/087
                                                                  205/766

(Continued)

FOREIGN PATENT DOCUMENTS

| JP | 2997741 B2 | 1/2000 |
|---|---|---|
| JP | 3008228 B2 | 2/2000 |

(Continued)

*Primary Examiner* — Kenneth Douyette
(74) *Attorney, Agent, or Firm* — Birch, Stewart, Kolasch & Birch, LLP

(57) ABSTRACT

Particulate silicon oxide having a Cu content of 100-20,000 ppm, an Fe content of 20-1,000 ppm, an Al content of up to 1,000 ppm, an average particle size of 0.1-30 μm, and a BET specific surface area of 0.5-30 m²/g is used as negative electrode material in constructing a nonaqueous electrolyte secondary battery. The secondary battery is improved in cycle performance while maintaining the high battery capacity and low volume expansion of silicon oxide.

13 Claims, 1 Drawing Sheet

(51) Int. Cl.
*H01M 4/02* (2006.01)
*H01G 11/06* (2013.01)

(56) References Cited

U.S. PATENT DOCUMENTS

| | | | |
|---|---|---|---|
| 5,395,711 A | 3/1995 | Tahara et al. | |
| 5,478,671 A | 12/1995 | Idota | |
| 5,961,944 A * | 10/1999 | Aratani | C01B 33/021 164/122.1 |
| 6,066,414 A | 5/2000 | Imoto et al. | |
| 2001/0012503 A1* | 8/2001 | Fukuoka | C01B 33/113 423/335 |
| 2002/0159941 A1* | 10/2002 | Fukuoka | C01B 33/113 423/335 |
| 2007/0003770 A1* | 1/2007 | Jacobsen | C01B 33/183 428/428 |
| 2007/0099436 A1* | 5/2007 | Kogetsu | C01B 33/113 438/770 |
| 2009/0047577 A1* | 2/2009 | Iwamoto | H01M 4/0423 429/218.1 |
| 2011/0287313 A1* | 11/2011 | Fukuoka | H01G 11/04 429/188 |
| 2012/0094178 A1* | 4/2012 | Loveridge | H01M 4/134 429/217 |

FOREIGN PATENT DOCUMENTS

| | | |
|---|---|---|
| JP | 3242751 B2 | 12/2001 |
| JP | 2005-053750 A | 3/2005 |
| JP | 3846661 B2 | 11/2006 |
| JP | 3918311 B2 | 5/2007 |

\* cited by examiner

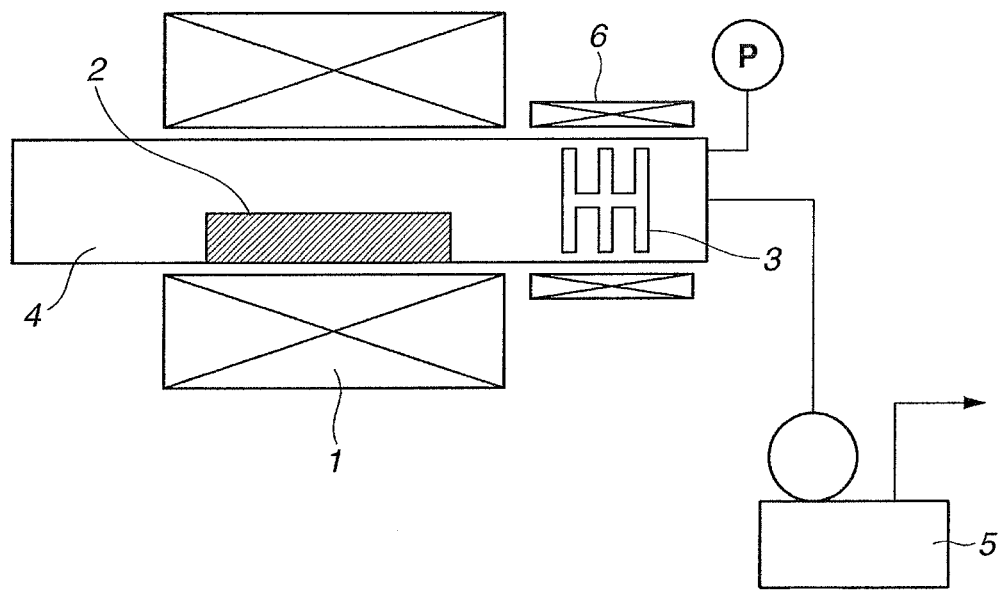

SILICON OXIDE, MAKING METHOD, NEGATIVE ELECTRODE, LITHIUM ION SECONDARY BATTERY, AND ELECTROCHEMICAL CAPACITOR

CROSS-REFERENCE TO RELATED APPLICATION

This non-provisional application claims priority under 35 U.S.C. §119(a) on Patent Application No. 2012-233972 filed in Japan on Oct. 23, 2012, the entire contents of which are hereby incorporated by reference.

TECHNICAL FIELD

This invention relates to particulate silicon oxide for use as negative electrode active material in nonaqueous electrolyte secondary batteries, a method of preparing the same, a negative electrode, a lithium ion secondary battery, and an electrochemical capacitor using the same.

BACKGROUND ART

In conjunction with the recent rapid advances of portable electronic equipment and communications instruments, nonaqueous electrolyte secondary batteries having a high energy density are strongly demanded from the aspects of cost, size and weight reductions. Approaches known in the art to increase the capacity of such nonaqueous electrolyte secondary batteries include, for example, use as negative electrode material of oxides of B, Ti, V, Mn, Co, Fe, Ni, Cr, Nb, and Mo and composite oxides thereof (Patent Documents 1 and 2); application as negative electrode material of $M_{100-x}Si_x$ wherein $x \geq 50$ at % and M=Ni, Fe, Co or Mn which is obtained by quenching from the melt (Patent Document 3); use as negative electrode material of silicon oxide (Patent Document 4); and use as negative electrode material of $Si_2N_2O$, $Ge_2N_2O$ or $Sn_2N_2O$ (Patent Document 5).

Among others, silicon oxide is represented by $SiO_x$ wherein x is slightly greater than the theoretical value of 1 due to oxide coating, and is found on X-ray diffractometry analysis to have the structure that amorphous silicon with a size from several nanometers to several tens of nanometers is finely dispersed in silica. Silicon oxide offers a greater battery capacity than the currently available carbon by a factor of 5 or 6 on a weight basis and relatively good cycle performance due to a less volume expansion. For these reasons, batteries using silicon oxide as the negative electrode material are regarded fully effective for use in portable electronic equipment such as mobile phones, lap-top computers and tablets. When the automotive application is considered, however, these batteries are insufficient in cycle performance and expensive.

CITATION LIST

Patent Document 1: JP 3008228
Patent Document 2: JP 3242751
Patent Document 3: JP 3846661
Patent Document 4: JP 2997741 (U.S. Pat. No. 5,395,711)
Patent Document 5: JP 3918311
Patent Document 6: JP-A 2005-53750

DISCLOSURE OF INVENTION

As compared with the currently available carbonaceous active material, the silicon oxide-based active material is expensive and inferior in cycle performance. A further improvement in battery performance of the silicon oxide-based active material is desired. An object of the invention is to provide particulate silicon oxide which is improved in cycle performance while maintaining the high battery capacity and low volume expansion of silicon oxide, so that it is effective as active material in negative electrode material for nonaqueous secondary batteries; a method of preparing the particulate silicon oxide; a negative electrode using the particulate silicon oxide; and a lithium ion secondary battery and electrochemical capacitor using the negative electrode.

With a focus on silicon oxide as a negative electrode active material which surpasses the battery capacity of the currently available carbon material, the inventors worked for a further improvement in battery performance and a cost reduction. It has been found that battery performance is affected by the contents of certain metals in silicon oxide, that silicon oxide particles with better properties are relatively readily obtained by limiting the contents of such metals to specific ranges, and that using such particulate silicon oxide as negative electrode active material, a nonaqueous electrolyte secondary battery having a high capacity and improved cycle performance can be constructed.

It is noted that Patent Document 6 discloses a method of preparing silicon oxide wherein a copper catalyst is added to a silicon oxide-providing feed material. The copper content in the silicon oxide of Patent Document 6 is different from that of the present invention. It is described or indicated nowhere in Patent Document 6 that the content of a certain metal has an impact on battery performance and improvements are achieved by limiting the content of a certain metal to a specific range. This was first discovered by the inventors.

In one aspect, the invention provides particulate silicon oxide for use as negative electrode material in nonaqueous electrolyte secondary batteries, having a Cu content of 100 to 20,000 ppm, an Fe content of 20 to 1,000 ppm, an Al content of up to 1,000 ppm, an average particle size of 0.1 to 30 μm, and a BET specific surface area of 0.5 to 30 $m^2/g$. Preferably the silicon oxide has a Cu content of 200 to 17,000 ppm, an Fe content of 25 to 800 ppm, and an Al content of less than 800 ppm.

In a second aspect, the invention provides a negative electrode in nonaqueous electrolyte secondary batteries, made of a negative electrode material comprising the silicon oxide defined above.

In a third aspect, the invention provides a lithium ion secondary battery comprising a positive electrode, a negative electrode, and a lithium ion-conducting nonaqueous electrolyte, said negative electrode being the negative electrode defined above.

In a fourth aspect, the invention provides an electrochemical capacitor comprising a positive electrode, a negative electrode, and a conductive electrolyte, said negative electrode being the negative electrode defined above.

In a fifth aspect, the invention provides a method for preparing particulate silicon oxide for use as negative electrode active material in nonaqueous electrolyte secondary batteries, comprising the steps of providing a feed material capable of generating SiO gas and having a Cu content of 500 to 100,000 ppm, an Fe content of 100 to 20,000 ppm, an Al content of up to 3,000 ppm; heating the feed material in an inert gas under normal or reduced pressure at a temperature in the range of 1,100 to 1,600° C. to generate a SiO gas; and cooling the gas to a temperature in the range of 500 to 1,100° C. for deposition. Preferably the feed material is a silicon oxide powder or a mixture of a silicon dioxide powder and a metallic silicon powder.

ADVANTAGEOUS EFFECTS OF INVENTION

Using a negative electrode comprising the particulate silicon oxide of the invention as negative electrode active material, a lithium ion secondary battery or electrochemical capacitor having a high capacity and improved cycle performance can be constructed. The method of preparing particulate silicon oxide is simple and lends itself to the manufacture on an industrial scale. As a consequence, nonaqueous electrolyte secondary batteries can be manufactured at low cost.

BRIEF DESCRIPTION OF DRAWINGS

The only FIGURE, FIG. 1 schematically illustrates an apparatus for the preparation of silicon oxide used in Examples and Comparative Examples.

DESCRIPTION OF EMBODIMENTS

As used herein, the term "ppm" is parts by weight per million parts by weight.

One embodiment of the invention is a particulate silicon oxide for use as negative electrode material in nonaqueous electrolyte secondary batteries, having a Cu content of 100 to 20,000 ppm, an Fe content of 20 to 1,000 ppm, and an Al content of up to 1,000 ppm on a weight basis. As long as the contents of these metals fall in the specific ranges, nonaqueous electrolyte secondary batteries, typically lithium ion secondary batteries, using the silicon oxide as negative electrode material are improved in cycle performance. Although the ground is not yet well understood, it is presumed that the inclusion of these metals in the particle interior in the specific ranges causes a change to the crystalline structure so that the volume change associated with occlusion and release of lithium ions is suppressed and ionic conduction is improved.

The copper content of the silicon oxide is 100 to 20,000 ppm. If the Cu content is less than 100 ppm, cycle performance is degraded. Inversely, if the Cu content exceeds 20,000 ppm, which means that the content of cupper as impurity is too high, the charge/discharge capacity is reduced. Preferably the Cu content is 200 to 17,000 ppm, and more preferably 300 to 15,000 ppm. The iron content is 20 to 1,000 ppm. If the Fe content is less than 20 ppm, cycle performance is degraded. Inversely, if the Fe content exceeds 1,000 ppm, which means that the content of iron as impurity is too high, the charge/discharge capacity is reduced. Preferably the Fe content is 25 to 800 ppm, and more preferably 30 to 700 ppm. The aluminum content is equal to or less than 1,000 ppm. If the Al content exceeds 1,000 ppm, the charge/discharge capacity is reduced. Preferably the Al content is less than 800 ppm, more preferably less than 500 ppm, and even more preferably less than 200 ppm.

The content of a metal in particles is measured as follows. First 50 wt % of hydrofluoric acid is added to a powder sample. Once reaction begins, 50 wt % of nitric acid is further added. The liquid is heated at 200° C. until complete melting. The liquid is analyzed by ICP-AES (Agilent 730C).

The silicon oxide is in particulate form. The silicon oxide powder should have an average particle size of 0.1 to 30 µm, preferably 0.2 to 20 µm. Setting the average particle size of silicon oxide powder to at least 0.1 µm prevents the powder from increasing its specific surface area to increase a proportion of silicon dioxide on particle surface. This concomitantly suppresses any reduction of a cell capacity when the powder is used as active material in the negative electrode of a nonaqueous electrolyte secondary battery. The setting also prevents the powder from reducing its bulk density and hence, prevents any drop of charge/discharge capacity per unit volume. In addition, such silicon oxide powder is easy to prepare and a negative electrode may be easily formed therefrom. Setting the average particle size of silicon oxide powder to at most 30 µm prevents the powder from becoming foreign particles when coated on an electrode and adversely affecting cell properties. In addition, a negative electrode may be easily formed and the risk of separation from the current collector (e.g., copper foil) is minimized. It is noted that the "average particle size" as used herein is a particle diameter (median diameter) corresponding to a cumulative weight of 50% in particle size distribution measurement by laser light diffractometry.

The silicon oxide particles should have a BET specific surface area of 0.5 to 30 m$^2$/g, preferably 1 to 20 m$^2$/g. A surface area of at least 0.5 m$^2$/g ensures a high surface activity and allows a binder to exhibit a bond strength during electrode fabrication, leading to improved cycle performance upon repetition of charge/discharge cycles. A surface area of up to 30 m$^2$/g is effective for preventing a proportion of silicon dioxide on particle surface from increasing to reduce the cell capacity when used as active material in a lithium ion secondary battery negative electrode, suppressing any increase of the amount of solvent absorbed during electrode fabrication, and eliminating a need to add a large amount of binder to maintain bond strength, with a concomitant reduction of conductivity causing deterioration of cycle performance. It is noted that the "BET specific surface area" as used herein is a value measured by the BET single-point method of evaluating an amount of N$_2$ gas adsorbed. A BET specific surface area in the above-defined range may be obtained by properly modifying the silicon oxide preparing process, typically by controlling the temperature of the deposition chamber and the concentration of silicon oxide vapor.

The silicon oxide (SiO) meeting the above parameters may be obtained, for example, by adjusting the amounts of metals in the silicon oxide-providing feed material. In this embodiment, particulate silicon oxide may be prepared by providing a feed material capable of generating SiO gas and having a Cu content of 500 to 100,000 ppm, an Fe content of 100 to 20,000 ppm, an Al content of up to 3,000 ppm, heating the feed material in an inert gas under normal or reduced pressure at a temperature in the range of 1,100 to 1,600° C. to generate a SiO gas, and cooling the gas to a temperature in the range of 500 to 1,100° C. for deposition.

The feed material used herein may be a silicon oxide powder or a mixture of a silicon dioxide (SiO$_2$) powder and a reducing powder. Examples of the reducing powder include metal silicon compounds and carbon-containing powders. Inter alia, a metal silicon powder is preferably used because of higher reactivity and yield. On use of a mixture of a silicon dioxide powder and a metal silicon powder, the reaction runs according to the following scheme.

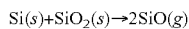

$$Si(s) + SiO_2(s) \rightarrow 2SiO(g)$$

With this reaction scheme, the mixture of a silicon dioxide powder and a metal silicon powder is capable of generating SiO gas at a high efficiency, ensuring a high reactivity and yield. Accordingly, by starting with such a powder mixture as the SiO gas-providing feed material, a silicon oxide compound can be prepared which may be used as negative electrode active material to construct a nonaqueous electrolyte secondary battery with a high capacity and cycle performance.

For the mixture of a silicon dioxide powder and a metal silicon powder, any suitable mixing ratio may be selected. Preferably, the metal silicon powder and the silicon dioxide powder are mixed in a molar ratio in the range: 1<metal silicon powder/silicon dioxide powder<1.1, and more preferably in the range: 1.01=metal silicon powder/silicon dioxide powder=1.08, when the presence of surface oxygen on the metal silicon powder and trace oxygen in the reactor furnace is taken into account.

The silicon dioxide powder used herein should preferably have an average particle size of up to 0.1 µm, more preferably 0.005 to 0.1 µm, and even more preferably 0.005 to 0.08 µm. The metal silicon powder used herein should preferably have an average particle size of up to 30 µm, more preferably 0.05 to 30 µm, and even more preferably 0.1 to 20 µm. If the average particle size of silicon dioxide powder exceeds 0.1 µm, or if the average particle size of metal silicon powder exceeds 30 µm, then reactivity may decline.

It is critical that the copper content of the SiO gas-providing feed material be 500 to 100,000 ppm. The Cu content is preferably 1,000 to 80,000 ppm, and more preferably 2,000 to 70,000 ppm. If the feed material has a Cu content of less than 500 ppm, the resulting silicon oxide may have a Cu content of less than 100 ppm, which is outside the scope of the invention. If the feed material has a Cu content in excess of 100,000 ppm, the resulting silicon oxide may have a Cu content of more than 20,000 ppm, which is also outside the scope of the invention. It is also critical that the iron content of the SiO gas-providing feed material be 100 to 20,000 ppm. The Fe content is preferably 200 to 15,000 ppm, and more preferably 300 to 10,000 ppm. If the feed material has a Fe content of less than 100 ppm, the resulting silicon oxide may have an Fe content of less than 20 ppm, which is outside the scope of the invention. If the feed material has an Fe content in excess of 20,000 ppm, the resulting silicon oxide may have an Fe content of more than 1,000 ppm, which is also outside the scope of the invention. The aluminum content of the SiO gas-providing feed material is preferably as low as possible (and may be zero) since aluminum is inert to the reaction. The Al content is preferably up to 3,000 ppm, more preferably up to 2,500 ppm, and even more preferably up to 2,000 ppm.

The metal contents of the feed material may be adjusted by any desired means, for example, by the following means.

1. Cu Content

Since metallic silicon typically contains little or no copper, the Cu content may be adjusted by adding a certain amount of Cu or a Cu compound.

2. Fe Content

The Fe content may be adjusted by adding a certain amount of Fe or an Fe compound or by selecting Fe-containing metallic silicon. Typically, it is simple to select and use chemical grade metallic silicon.

3. Al Content

The Al content may be adjusted simply by selecting a suitable grade of metallic silicon, typically a choice of metallic silicon among chemical grade, ceramic grade and semiconductor grade.

In one embodiment, the SiO gas-providing feed material is heated in an inert gas under normal or reduced pressure at a temperature in the range of 1,100 to 1,600° C. to generate a SiO gas, and the gas is then cooled for effecting precipitation or deposition, obtaining a precipitate or deposit. A heating temperature below 1,100° C. is too low for reaction to proceed, leading to a reduced emission of SiO gas and hence, a substantially reduced yield. If the heating temperature exceeds 1,600° C., problems arise that the feed powder mixture can be melted to interfere with reactivity and reduce the emission of SiO gas and a choice of the reactor material is difficult. For this reason, the heating temperature is in the range of 1,100 to 1,600° C. The presence of an inert gas which may be under atmospheric or reduced pressure is essential during the heating step, because otherwise the SiO gas once generated becomes unstable, and the reaction efficiency of silicon oxide is reduced, both leading to a reduced yield.

Upon cooling, the SiO gas precipitates as a deposit. The gas may be cooled by any desired means, for example, by introducing the gas in a cooling zone to deposit on a substrate, or by spraying the gas into a cooling atmosphere. In one typical means, the mix gas flows in a cooling zone where the gas deposits on a substrate. Although the material of the substrate for deposition is not particularly limited, high-melting point metals such as stainless steel, molybdenum, tungsten and alloys thereof are preferably used for ease of working. The cooling zone is preferably at a temperature of 500 to 1,100° C., more preferably 600 to 1,000° C. A deposition temperature of at least 500° C. makes it easy to prevent the reaction product from increasing its BET surface area beyond 30 m$^2$/g. If the deposition temperature is equal to or lower than 1,100° C., a choice of the substrate material is easy and the deposition apparatus may be of low cost. The temperature of the deposition substrate may be controlled by heater power, thermal insulation ability (e.g., insulating wall thickness), forced cooling, or the like.

If necessary, the deposit may be ground to any desired particle size by well-known means, typically a grinding machine with classifier. Preferably, the deposit is ground to the desired particle size by a grinding machine devoid of iron contamination. As used herein, the "grinding machine devoid of iron contamination" is a grinding machine comprising a grinding section and a contact section both made of an iron-free material. Although the iron-free material is not particularly limited, preference is given to ceramic materials including alumina, zirconia, SiAlON, silicon carbide, and silicon nitride based materials. The contamination of iron as foreign matter at this stage is undesirable because iron can cause an accident of ignition due to short-circuiting, detracting from safety, when the silicon oxide is used as active material in negative electrode material for nonaqueous electrolyte secondary batteries, typically lithium ion secondary batteries.

To impart electroconductivity to the resulting silicon oxide particles, carbon may be deposited or coated thereon by chemical vapor deposition or mechanical alloying. When carbon coating is employed, the coverage (or coating weight) of carbon is preferably 1 to 50% by weight, more preferably 1 to 30% by weight based on the total weight of carbon-coated silicon oxide particles.

The chemical vapor deposition of carbon may be conducted by introducing a hydrocarbon base compound gas and/or vapor into a deposition reactor chamber at a temperature in the range of 600 to 1,200° C., preferably 800 to 1,100° C. and under atmospheric or reduced pressure, where thermal chemical vapor deposition takes place in a well-known manner. It is also acceptable to form silicon composite particles in which a silicon carbide layer is formed at the silicon-carbon layer interface. The hydrocarbon base compound used herein is thermally decomposed at the indicated temperature to form carbon. Examples of the hydrocarbon base compound include hydrocarbons such as methane, ethane, propane, butane, pentane, hexane, ethylene, propylene, butylene, and acetylene, alone or in admixture; alcohol compounds such as methanol and ethanol; mono- to tri-cyclic aromatic hydrocarbons such as benzene, toluene, xylene, styrene, ethylbenzene, diphenylmethane, naphthalene, phenol, cresol, nitrobenzene, chlorobenzene, indene, coumarone, pyridine, anthracene, and phenanthrene, alone or in admixture, and mixtures of the foregoing. Also, gas light oil, creosote oil and anthracene oil obtained from the tar distillation step are useful as well as naphtha cracked tar oil, alone or in admixture.

Negative Electrode Material

The particulate silicon oxide thus obtained is suitable as negative electrode active material for use in nonaqueous electrolyte secondary batteries. Using the particulate silicon oxide as active material, a negative electrode material may be prepared for forming a negative electrode suitable for use in nonaqueous electrolyte secondary batteries. Since the nonaqueous electrolyte secondary battery constructed using the negative electrode exerts good cycle performance while maintaining a high battery capacity and a low volume expansion inherent to silicon oxide, it is best suited in the automotive application where these properties are required.

In addition to the particulate silicon oxide, the negative electrode material may contain optional components such as conductive agent, binder and solvent. The type of conductive agent used herein is not particularly limited as long as it is an electronic conductive material which does not undergo decomposition or alteration in the battery. Illustrative conductive agents include metals in powder or fiber form such as Al, Ti, Fe, Ni, Cu, Zn, Ag, Sn and Si, natural graphite, synthetic graphite, various coke powders, meso-phase carbon, vapor phase grown carbon fibers, pitch base carbon fibers, PAN base carbon fibers, and graphite obtained by firing various resins. Suitable binders include polyimide resins and aromatic polyimide resins. Suitable solvents include N-methylpyrrolidone and water.

The particulate silicon oxide is preferably present in an amount of 20 to 80%, more preferably 30 to 70% by weight based on the negative electrode (i.e., the solids of the negative electrode material). When optional components are blended, the conductive agent is preferably present in an amount of 20 to 80% by weight, and the binder is preferably present in an amount of 5 to 20% by weight based on the negative electrode (i.e., the solids of the negative electrode material).

Negative Electrode

The negative electrode material may be shaped into a negative electrode. Typically the negative electrode is prepared by combining the silicon oxide particles with a conductive agent as mentioned above, a binder such as polyimide resin or aromatic polyimide resin, and other additives, kneading them in a solvent such as N-methylpyrrolidone or water to form a paste-like mix, and applying the mix in sheet form to a current collector. The current collector used herein may be a foil of any material which is commonly used as the negative electrode current collector, for example, a copper or nickel foil while the thickness and surface treatment thereof are not particularly limited. The method of shaping or molding the mix into a sheet is not particularly limited, and any well-known method may be used.

Lithium Ion Secondary Battery

A further embodiment is a lithium ion secondary battery comprising at least a positive electrode, a negative electrode comprising the particulate silicon oxide as active material, and a lithium ion-conducting nonaqueous electrolyte. This battery exhibits improved battery performance, especially charge/discharge capacity and cycle performance.

The lithium ion secondary battery is characterized by the use of the negative electrode material comprising the inventive silicon oxide particles as active material while the materials of the positive electrode, electrolyte, and separator and the battery design may be well-known ones and are not particularly limited. For example, the positive electrode active material used herein may be selected from transition metal oxides and chalcogen compounds such as $LiCoO_2$, $LiNiO_2$, $LiMn_2O_4$, $V_2O_5$, $MnO_2$, $TiS_2$ and $MoS_2$. The electrolytes used herein may be lithium salts such as lithium perchlorate in nonaqueous solution form. Examples of the nonaqueous solvent include propylene carbonate, ethylene carbonate, dimethoxyethane, γ-butyrolactone and 2-methyltetrahydrofuran, alone or in admixture. Use may also be made of other various nonaqueous electrolytes and solid electrolytes.

The separator disposed between positive and negative electrodes is not particularly limited as long as it is stable to the electrolyte liquid and effectively retains the liquid. Often, porous sheets or non-woven fabrics of polyolefins such as polyethylene and polypropylene, copolymers thereof, and aramide resins are used. They may be used as a single layer or a laminate of multiple layers while they may be surface covered with a layer of ceramic material such as metal oxide. Porous glass or ceramic material may also be used.

Electrochemical Capacitor

A still further embodiment is an electrochemical capacitor comprising at least a positive electrode, a negative electrode comprising the inventive silicon oxide particles as active material, and a conductive electrolyte. The electrochemical capacitor using the inventive silicon oxide particles as active material in its negative electrode exhibits good capacitor properties such as charge/discharge capacity and cycle performance. The electrochemical capacitor is characterized by the negative electrode comprising the silicon oxide active material defined herein, while other materials such as electrolyte and separator and capacitor design are not particularly limited. Examples of the electrolyte used herein include nonaqueous solutions of lithium salts such as lithium hexafluorophosphate, lithium perchlorate, lithium borofluoride, and lithium hexafluoroarsenate. Exemplary nonaqueous solvents include propylene carbonate, ethylene carbonate, dimethyl carbonate, diethyl carbonate, dimethoxyethane, γ-butyrolactone, and 2-methyltetrahydrofuran, alone or a combination of two or more. Other various nonaqueous electrolytes and solid electrolytes may also be used.

EXAMPLE

Examples and Comparative Examples are given below for further illustrating the invention although the invention is not limited thereto.

Example 1

Silicon oxide was produced using a horizontal tubular furnace as shown in FIG. 1. A reactor tube 4 of alumina having an inner diameter of 120 mm was coupled with a heater 1 and a vacuum pump 5, and included a deposition zone surrounded by another heater 6, where a substrate 3 was disposed. A feed material 2 was prepared by mixing equimolar amounts of chemical grade metallic silicon powder having an average particle size of 8 μm (Fe content 2,000 ppm, Al content 1,200 ppm) and fumed silica ($SiO_2$) powder having an average particle size of 12 nm and a BET specific surface area of 200 $m^2/g$ and containing 0 ppm of metal impurities, adding 3 wt % of metallic copper powder (#325 pass) thereto, and mixing them. The reactor tube 4 was charged with 100 g of the feed material 2. Notably, the feed material had a Cu content of 2.91 wt %, an Fe content of 640 ppm and an Al content of 380 ppm.

Then the reactor tube 4 was evacuated to a reduced pressure of 20 Pa or lower by the vacuum pump 5 while it was heated up to 1,400° C. at a rate of 300° C./hr by the heater 1. The tube 4 was held at the temperature for 1 hour. The deposition zone was heated and held at 900° C. by the heater 6 for maintaining the deposition temperature constant. With the heaters turned off, the tube was then cooled to room temperature.

On cooling, the gas precipitated on the substrate 3 as a black mass deposit. The deposit was recovered 88 g while 6.2 g of a reaction residue was left (conversion degree 93.8%). A 50-g portion of the deposit was dry ground in a 2-L ball mill of alumina, yielding silicon oxide particles. The silicon oxide particles obtained were measured for average particle size and BET specific surface area. The Cu, Fe and Al contents of the silicon oxide particles were measured by adding 50 wt % of hydrofluoric acid to a powder sample, further adding 50 wt % of nitric acid after the beginning of reaction, heating at 200° C. for complete melting, and analyzing the melt by ICP-AES (Agilent 730C). The production conditions are tabulated in Table 1 and the measurement results are shown in Tables 2 and 3.

Cell Test

The silicon oxide particles were treated as follows before a battery was constructed using the particles as negative electrode active material. The battery was evaluated for performance.

First, the silicon oxide particles were combined with 45 wt % of artificial graphite having an average particle size of 10 μm and 10 wt % of polyimide. Further N-methylpyrrolidone was added thereto to form a slurry. The slurry was coated onto a copper foil of 12 μm thick, dried at 80° C. for 1 hour, and pressure formed into an electrode by a roller press. The electrode was vacuum dried at 350° C. for 1 hour, and punched into a piece of 2 cm$^2$ which served as a negative electrode.

To evaluate the charge/discharge performance of the negative electrode, a test lithium ion secondary cell was constructed using a lithium foil as the counter electrode. The electrolyte used was a nonaqueous electrolyte solution of lithium hexafluorophosphate in a 1/1 (by volume) mixture of ethylene carbonate and diethyl carbonate in a concentration of 1 mol/liter. The separator used was a microporous polyethylene film of 30 μm thick.

The lithium ion secondary cell thus constructed was allowed to stand overnight at room temperature. Using a secondary cell charge/discharge tester (Nagano K.K.), a charge/discharge test was carried out on the cell. Charging was conducted with a constant current flow of 0.5 mA/cm$^2$ until the voltage of the test cell reached 0 V, and after reaching 0 V, continued with a reduced current flow so that the cell voltage was kept at 0 V, and terminated when the current flow decreased below 40 μA/cm$^2$. Discharging was conducted with a constant current flow of 0.5 mA/cm$^2$ and terminated when the cell voltage rose above 2.0 V, from which a discharge capacity was determined.

By repeating the above operation, the charge/discharge test was carried out 50 cycles on the lithium ion secondary cell. The discharge capacity was evaluated after 50 cycles. The results of the cell test are shown in Tables 2 and 3.

Example 2

Silicon oxide particles were produced as in Example 1 aside from changing the addition amount of metallic copper powder so as to give a Cu content of 800 ppm. As in Example 1, particle physical properties and cell performance were evaluated. The production conditions are tabulated in Table 1, and the measurement results shown in Tables 2 and 3.

Example 3

Silicon oxide particles were produced as in Example 1 aside from changing the addition amount of metallic copper powder so as to give a Cu content of 9 wt %. As in Example 1, particle physical properties and cell performance were evaluated. The production conditions are tabulated in Table 1, and the measurement results shown in Tables 2 and 3.

Example 4

Silicon oxide particles were produced as in Example 1 aside from using ceramic grade (A) metallic silicon powder (Fe content 400 ppm, Al content 230 ppm). As in Example 1, particle physical properties and cell performance were evaluated. The production conditions are tabulated in Table 1, and the measurement results shown in Tables 2 and 3.

Example 5

Silicon oxide particles were produced as in Example 1 aside from adding 5 wt % of iron powder (#325 pass) to the chemical grade metallic silicon powder. As in Example 1, particle physical properties and cell performance were evaluated. The production conditions are tabulated in Table 1, and the measurement results shown in Tables 2 and 3.

Example 6

Silicon oxide particles were produced as in Example 1 except that the deposition zone temperature was 600° C. As in Example 1, particle physical properties and cell performance were evaluated. The production conditions are tabulated in Table 1, and the measurement results shown in Tables 2 and 3.

Example 7

Silicon oxide particles were produced as in Example 1 except that the deposition zone temperature was 1,050° C. As in Example 1, particle physical properties and cell performance were evaluated. The production conditions are tabulated in Table 1, and the measurement results shown in Tables 2 and 3.

Comparative Example 1

Silicon oxide particles were produced as in Example 1 except that the addition of metallic copper powder was omitted. As in Example 1, particle physical properties and cell performance were evaluated. The production conditions are tabulated in Table 1, and the measurement results shown in Tables 2 and 3.

Comparative Example 2

Silicon oxide particles were produced as in Example 1 aside from changing the addition amount of metallic copper powder so as to give a Cu content of 50 ppm. As in Example 1, particle physical properties and cell performance were evaluated. The production conditions are tabulated in Table 1, and the measurement results shown in Tables 2 and 3.

Comparative Example 3

Silicon oxide particles were produced as in Example 1 aside from changing the addition amount of metallic copper powder so as to give a Cu content of 12 wt %. As in Example 1, particle physical properties and cell performance were evaluated. The production conditions are tabulated in Table 1, and the measurement results shown in Tables 2 and 3.

Comparative Example 4

Silicon oxide particles were produced as in Example 1 aside from using ceramic grade (B) metallic silicon powder (Fe content 250 ppm, Al content 180 ppm). As in Example 1, particle physical properties and cell performance were evaluated. The production conditions are tabulated in Table 1, and the measurement results shown in Tables 2 and 3.

Comparative Example 5

Silicon oxide particles were produced as in Example 1 aside from adding 7.5 wt % of iron powder (#325 pass) to the chemical grade metallic silicon powder. As in Example 1, particle physical properties and cell performance were evaluated. The production conditions are tabulated in Table 1, and the measurement results shown in Tables 2 and 3.

Comparative Example 6

Silicon oxide particles were produced as in Example 1 aside from using low purity grade metallic silicon powder (Fe content 35,000 ppm, Al content 15,000 ppm) instead of the chemical grade metallic silicon powder. As in Example 1, particle physical properties and cell performance were evaluated. The production conditions are tabulated in Table 1, and the measurement results shown in Tables 2 and 3.

Comparative Example 7

Silicon oxide particles were produced as in Example 1 except that the deposition zone temperature was 450° C. As in Example 1, particle physical properties and cell performance were evaluated. The production conditions are tabulated in Table 1, and the measurement results shown in Tables 2 and 3.

Comparative Example 8

Silicon oxide particles were produced as in Example 1 except that the deposition zone temperature was 1,150° C. As in Example 1, particle physical properties and cell performance were evaluated. The production conditions are tabulated in Table 1, and the measurement results shown in Tables 2 and 3.

TABLE 1

| | | | Si | | | Powder mixture | | | |
| --- | --- | --- | --- | --- | --- | --- | --- | --- | --- |
| | | Grade | Fe content (ppm) | Al content (ppm) | Cu addition | Fe content (ppm) | Al content (ppm) | Cu content (ppm) | Deposition temperature (° C.) |
| Example | 1 | Chemical G | 2,000 | 1,200 | 3% | 640 | 380 | 2.91% | 900 |
| | 2 | Chemical G | 2,000 | 1,200 | 800 ppm | 640 | 380 | 800 | 900 |
| | 3 | Chemical G | 2,000 | 1,200 | 9% | 640 | 380 | 8.26% | 900 |
| | 4 | Ceramic G (A) | 400 | 230 | 3% | 130 | 70 | 2.91% | 900 |
| | 5 | Chemical G + 5% Fe added | 52,000 | 1,200 | 3% | 16,500 | 380 | 2.91% | 900 |
| | 6 | Chemical G | 2,000 | 1,200 | 3% | 640 | 380 | 2.91% | 600 |
| | 7 | Chemical G | 2,000 | 1,200 | 3% | 640 | 380 | 2.91% | 1,050 |
| Comparative Example | 1 | Chemical G | 2,000 | 1,200 | No added | 640 | 380 | 0 | 900 |
| | 2 | Chemical G | 2,000 | 1,200 | 50 ppm | 640 | 380 | 50 | 900 |
| | 3 | Chemical G | 2,000 | 1,200 | 12% | 640 | 380 | 10.7% | 900 |
| | 4 | Ceramic G (B) | 250 | 180 | 3% | 80 | 60 | 2.91% | 900 |
| | 5 | Chemical G + 7.5% Fe added | 77,000 | 1,200 | 3% | 24,500 | 380 | 2.91% | 900 |
| | 6 | Low purity G | 35,000 | 15,000 | 3% | 11,000 | 4,800 | 2.91% | 900 |
| | 7 | Chemical G | 2,000 | 1,200 | 3% | 640 | 380 | 2.91% | 450 |
| | 8 | Chemical G | 2,000 | 1,200 | 3% | 640 | 380 | 2.91% | 1,150 |

TABLE 2

| | | Reaction | | Physical properties of silicon oxide particles | | | | |
| --- | --- | --- | --- | --- | --- | --- | --- | --- |
| | | Reaction residue (g) | Conversion degree (%) | Average particle size (μm) | BET surface area (m²/g) | Cu content (ppm) | Fe content (ppm) | Al content (ppm) |
| Example | 1 | 6.2 | 93.8 | 5.8 | 5.3 | 3,200 | 65 | 160 |
| | 2 | 9.3 | 90.7 | 5.7 | 5.8 | 130 | 62 | 150 |
| | 3 | 8.1 | 91.9 | 5.8 | 4.8 | 16,000 | 60 | 150 |
| | 4 | 6.8 | 93.2 | 5.8 | 5.4 | 3,200 | 25 | 140 |
| | 5 | 8.9 | 91.1 | 5.7 | 5.1 | 3,100 | 900 | 170 |
| | 6 | 6.3 | 93.7 | 5.8 | 23.8 | 3,100 | 67 | 160 |
| | 7 | 6.3 | 93.7 | 5.7 | 2.3 | 3,200 | 64 | 150 |
| Comparative Example | 1 | 11.5 | 88.5 | 5.7 | 5.5 | 0 | 67 | 150 |
| | 2 | 11 | 89.0 | 5.8 | 5.5 | 8 | 65 | 160 |
| | 3 | 10.3 | 89.7 | 5.8 | 4.3 | 25,000 | 68 | 150 |
| | 4 | 6.7 | 93.3 | 5.7 | 5.3 | 3,200 | 12 | 130 |
| | 5 | 11.8 | 88.2 | 5.8 | 5.0 | 3,100 | 1,300 | 170 |
| | 6 | 8.4 | 91.6 | 5.8 | 5.2 | 3,100 | 680 | 1,200 |
| | 7 | 6.2 | 93.8 | 5.8 | 37.8 | 3,200 | 63 | 150 |
| | 8 | 6.3 | 93.7 | 5.8 | 0.4 | 3,200 | 65 | 160 |

TABLE 3

| | | Initial cell performance | | | 50-th cycle cell performance | |
|---|---|---|---|---|---|---|
| | | Charge capacity (mAh/g) | Discharge capacity (mAh/g) | Initial efficiency (%) | Charge capacity (mAh/g) | Cycle retentivity (%) |
| Example | 1 | 1,310 | 1,010 | 77.1 | 980 | 97 |
| | 2 | 1,300 | 1,010 | 77.7 | 970 | 96 |
| | 3 | 1,270 | 980 | 77.2 | 960 | 98 |
| | 4 | 1,300 | 1,000 | 76.9 | 970 | 97 |
| | 5 | 1,290 | 1,000 | 77.5 | 980 | 98 |
| | 6 | 1,270 | 970 | 76.4 | 940 | 97 |
| | 7 | 1,310 | 1,010 | 77.1 | 970 | 96 |
| Comparative Example | 1 | 1,300 | 990 | 76.2 | 940 | 95 |
| | 2 | 1,300 | 990 | 76.2 | 940 | 95 |
| | 3 | 1,210 | 930 | 76.9 | 900 | 97 |
| | 4 | 1,290 | 1,000 | 77.5 | 950 | 95 |
| | 5 | 1,250 | 960 | 76.8 | 930 | 97 |
| | 6 | 1,200 | 920 | 76.7 | 870 | 95 |
| | 7 | 1,220 | 940 | 77.0 | 900 | 96 |
| | 8 | 1,310 | 1,000 | 76.3 | 920 | 92 |

As shown in Tables 2 and 3, the silicon oxide particles produced by the method of Example 1 had an average particle size of 5.8 μm, a BET surface area of 5.3 m²/g, a Cu content of 3,200 ppm, an Fe content of 65 ppm, and an Al content of 160 ppm. The silicon oxide particles of Example 2 had an average particle size of 5.7 μm, a BET surface area of 5.8 m²/g, a Cu content of 130 ppm, an Fe content of 62 ppm, and an Al content of 150 ppm. The silicon oxide particles of Example 3 had an average particle size of 5.8 μm, a BET surface area of 4.8 m²/g, a Cu content of 16,000 ppm, an Fe content of 60 ppm, and an Al content of 150 ppm. The silicon oxide particles of Example 4 had an average particle size of 5.8 μm, a BET surface area of 5.4 m²/g, a Cu content of 3,200 ppm, an Fe content of 25 ppm, and an Al content of 140 ppm. The silicon oxide particles of Example 5 had an average particle size of 5.7 μm, a BET surface area of 5.1 m²/g, a Cu content of 3,100 ppm, an Fe content of 900 ppm, and an Al content of 170 ppm. The silicon oxide particles of Example 6 had an average particle size of 5.8 μm, a BET surface area of 23.8 m²/g, a Cu content of 3,100 ppm, an Fe content of 67 ppm, and an Al content of 160 ppm. The silicon oxide particles of Example 7 had an average particle size of 5.7 μm, a BET surface area of 2.3 m²/g, a Cu content of 3,200 ppm, an Fe content of 64 ppm, and an Al content of 150 ppm.

In contrast, the silicon oxide particles of Comparative Example 1 had an average particle size of 5.7 μm, a BET surface area of 5.5 m²/g, a Cu content of 0 ppm, an Fe content of 67 ppm, and an Al content of 150 ppm. The silicon oxide particles of Comparative Example 2 had an average particle size of 5.8 μm, a BET surface area of 5.5 m²/g, a Cu content of 8 ppm, an Fe content of 65 ppm, and an Al content of 160 ppm. The silicon oxide particles of Comparative Example 3 had an average particle size of 5.8 μm, a BET surface area of 4.3 m²/g, a Cu content of 25,000 ppm, an Fe content of 68 ppm, and an Al content of 150 ppm. The silicon oxide particles of Comparative Example 4 had an average particle size of 5.7 μm, a BET surface area of 5.3 m²/g, a Cu content of 3,200 ppm, an Fe content of 12 ppm, and an Al content of 130 ppm. The silicon oxide particles of Comparative Example 5 had an average particle size of 5.8 μm, a BET surface area of 5.0 m²/g, a Cu content of 3,100 ppm, an Fe content of 1,300 ppm, and an Al content of 170 ppm. The silicon oxide particles of Comparative Example 6 had an average particle size of 5.8 μm, a BET surface area of 5.2 m²/g, a Cu content of 3,100 ppm, an Fe content of 680 ppm, an Al content of 1,200 ppm. The silicon oxide particles of Comparative Example 7 had an average particle size of 5.8 μm, a BET surface area of 37.8 m²/g, a Cu content of 3,200 ppm, an Fe content of 63 ppm, and an Al content of 150 ppm. The silicon oxide particles of Comparative Example 8 had an average particle size of 5.8 μm, a BET surface area of 0.4 m²/g, a Cu content of 3,200 ppm, an Fe content of 65 ppm, and an Al content of 160 ppm.

As also shown in Table 2, Example 1 had a conversion degree of 93.8%. The lithium ion secondary cell having a negative electrode made of a material using the silicon oxide particles of Example 1 marked an initial charge capacity of 1,310 mAh/g, an initial discharge capacity of 1,010 mAh/g, a 50-th cycle discharge capacity of 980 mAh/g, and a cycle retentivity of 97% after 50 cycles. The cell had a high capacity and improved cycle performance.

Example 2 had a conversion degree of 90.7%. The lithium ion secondary cell having a negative electrode made of a material using the silicon oxide particles of Example 2 marked an initial charge capacity of 1,300 mAh/g, an initial discharge capacity of 1,010 mAh/g, a 50-th cycle discharge capacity of 970 mAh/g, and a cycle retentivity of 96% after 50 cycles. The cell had a high capacity and improved cycle performance.

Example 3 had a conversion degree of 91.9%. The lithium ion secondary cell having a negative electrode made of a material using the silicon oxide particles of Example 3 marked an initial charge capacity of 1,270 mAh/g, an initial discharge capacity of 980 mAh/g, a 50-th cycle discharge capacity of 960 mAh/g, and a cycle retentivity of 98% after 50 cycles. The cell had a high capacity and improved cycle performance.

Example 4 had a conversion degree of 93.2%. The lithium ion secondary cell having a negative electrode made of a material using the silicon oxide particles of Example 4 marked an initial charge capacity of 1,300 mAh/g, an initial discharge capacity of 1,000 mAh/g, a 50-th cycle discharge capacity of 970 mAh/g, and a cycle retentivity of 97% after 50 cycles. The cell had a high capacity and improved cycle performance.

Example 5 had a conversion degree of 91.1%. The lithium ion secondary cell having a negative electrode made of a material using the silicon oxide particles of Example 5 marked an initial charge capacity of 1,290 mAh/g, an initial discharge capacity of 1,000 mAh/g, a 50-th cycle discharge capacity of 980 mAh/g, and a cycle retentivity of 98% after 50 cycles. The cell had a high capacity and improved cycle performance.

Example 6 had a conversion degree of 93.7%. The lithium ion secondary cell having a negative electrode made of a material using the silicon oxide particles of Example 6 marked an initial charge capacity of 1,270 mAh/g, an initial discharge capacity of 970 mAh/g, a 50-th cycle discharge capacity of 940 mAh/g, and a cycle retentivity of 97% after 50 cycles. The cell had a high capacity and improved cycle performance.

Example 7 had a conversion degree of 93.7%. The lithium ion secondary cell having a negative electrode made of a material using the silicon oxide particles of Example 7 marked an initial charge capacity of 1,310 mAh/g, an initial discharge capacity of 1,010 mAh/g, a 50-th cycle discharge capacity of 970 mAh/g, and a cycle retentivity of 96% after 50 cycles. The cell had a high capacity and improved cycle performance.

It was demonstrated that Examples started with satisfactory reaction materials, and offered lithium ion secondary cells with a high capacity and improved cycle performance.

In contrast, Comparative Example 1 had a conversion degree of 88.5%, indicating inferior reaction material to Examples 1 to 7. The lithium ion secondary cell using the silicon oxide particles of Comparative Example 1 marked an initial charge capacity of 1,300 mAh/g, an initial discharge capacity of 990 mAh/g, a 50-th cycle discharge capacity of 940 mAh/g, and a cycle retentivity of 95% after 50 cycles. The cell showed inferior cycle performance as compared with the use of silicon oxide particles of Examples 1 to 7.

Comparative Example 2 had a conversion degree of 89.0%, indicating inferior reaction material to Examples 1 to 7. The lithium ion secondary cell using the silicon oxide particles of Comparative Example 2 marked an initial charge capacity of 1,300 mAh/g, an initial discharge capacity of 990 mAh/g, a 50-th cycle discharge capacity of 940 mAh/g, and a cycle retentivity of 95% after 50 cycles. The cell showed inferior cycle performance as compared with the use of silicon oxide particles of Examples 1 to 7.

Comparative Example 3 had a conversion degree of 89.7%, indicating inferior reaction material to Examples 1 to 7. The lithium ion secondary cell using the silicon oxide particles of Comparative Example 3 marked an initial charge capacity of 1,210 mAh/g, an initial discharge capacity of 930 mAh/g, a 50-th cycle discharge capacity of 900 mAh/g, and a cycle retentivity of 97% after 50 cycles. The cell showed a low capacity as compared with the use of silicon oxide particles of Examples 1 to 7.

Comparative Example 4 had a conversion degree of 93.3%, indicating inferior reaction material to Examples 1 to 7. The lithium ion secondary cell using the silicon oxide particles of Comparative Example 4 marked an initial charge capacity of 1,290 mAh/g, an initial discharge capacity of 1,000 mAh/g, a 50-th cycle discharge capacity of 950 mAh/g, and a cycle retentivity of 95% after 50 cycles. The cell showed inferior cycle performance as compared with the use of silicon oxide particles of Examples 1 to 7.

Comparative Example 5 had a conversion degree of 88.2%, indicating inferior reaction material to Examples 1 to 7. The lithium ion secondary cell using the silicon oxide particles of Comparative Example 5 marked an initial charge capacity of 1,250 mAh/g, an initial discharge capacity of 960 mAh/g, a 50-th cycle discharge capacity of 930 mAh/g, and a cycle retentivity of 97% after 50 cycles. The cell showed a low capacity as compared with the use of silicon oxide particles of Examples 1 to 7.

Comparative Example 6 had a conversion degree of 91.6%, indicating satisfactory reaction material. However, the lithium ion secondary cell using the silicon oxide particles of Comparative Example 6 marked an initial charge capacity of 1,200 mAh/g, an initial discharge capacity of 920 mAh/g, a 50-th cycle discharge capacity of 870 mAh/g, and a cycle retentivity of 95% after 50 cycles. The cell showed a low capacity and inferior cycle performance as compared with the use of silicon oxide particles of Examples 1 to 7.

Comparative Example 7 had a conversion degree of 93.8%, indicating satisfactory reaction material. However, the lithium ion secondary cell using the silicon oxide particles of Comparative Example 7 marked an initial charge capacity of 1,220 mAh/g, an initial discharge capacity of 940 mAh/g, a 50-th cycle discharge capacity of 900 mAh/g, and a cycle retentivity of 96% after 50 cycles. The cell showed a low capacity as compared with the use of silicon oxide particles of Examples 1 to 7.

Comparative Example 8 had a conversion degree of 93.7%, indicating satisfactory reaction material. However, the lithium ion secondary cell using the silicon oxide particles of Comparative Example 7 marked an initial charge capacity of 1,310 mAh/g, an initial discharge capacity of 1,000 mAh/g, a 50-th cycle discharge capacity of 920 mAh/g, and a cycle retentivity of 92% after 50 cycles. The cell showed inferior cycle performance as compared with the use of silicon oxide particles of Examples 1 to 7.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

Japanese Patent Application No. 2012-233972 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A particulate silicon oxide for use as negative electrode material in nonaqueous electrolyte secondary batteries, having a Cu content of 100 to 20,000 ppm, an Fe content of 20 to 1,000 ppm, an Al content of up to 1,000 ppm, an average particle size of 0.1 to 30 μm, and a BET specific surface area of 0.5 to 30 m$^2$/g.

2. The silicon oxide of claim 1, having a Cu content of 200 to 17,000 ppm, an Fe content of 25 to 900 ppm, and an Al content of less than 800 ppm.

3. A negative electrode in nonaqueous electrolyte secondary batteries, made of a negative electrode material comprising the silicon oxide of claim 1.

4. A lithium ion secondary battery comprising a positive electrode, a negative electrode, and a lithium ion-conducting nonaqueous electrolyte, said negative electrode being the negative electrode of claim 3.

5. An electrochemical capacitor comprising a positive electrode, a negative electrode, and a conductive electrolyte, said negative electrode being the negative electrode of claim 3.

6. The silicon oxide of claim 1, having a Cu content of 130 to 16,000 ppm, an Fe content of 25 to 900 ppm, and an Al content of 140 to 160 ppm.

7. The silicon oxide of claim 1, wherein the silicon oxide is prepared by a method comprising the steps of:
  adjusting a Cu content to 500 to 100,000 ppm in a feed material by adding Cu to the feed material,
  adjusting a Fe content to 100 to 20,000 ppm in a feed material by adding Fe to the feed material or selecting Fe-containing metallic silicon, and
  adjusting an Al content of up to 3,000 ppm in a feed material by selecting a suitable grade of metallic silicon,
  providing the feed material capable of generating SiO gas and having a Cu content of 500 to 100,000 ppm, an Fe content of 100 to 20,000 ppm, and an Al content of up to 3,000 ppm,
  heating the feed material in an inert gas under normal or reduced pressure at a temperature in the range of 1,100 to 1,600° C. to generate a SiO gas, and
  cooling the gas to a temperature in the range of 500 to 1,100° C. for deposition.

8. A method for preparing particulate silicon oxide for use as negative electrode active material in nonaqueous electrolyte secondary batteries, comprising the steps of:

providing a feed material capable of generating SiO gas and having a Cu content of 500 to 100,000 ppm, an Fe content of 100 to 20,000 ppm, and an Al content of up to 3,000 ppm, heating the feed material in an inert gas under normal or reduced pressure at a temperature in the range of 1,100 to 1,600° C. to generate a SiO gas, and cooling the gas to a temperature in the range of 500 to 1,100° C. for deposition.

9. The method of claim 8 wherein the feed material is a silicon oxide powder or a mixture of a silicon dioxide powder and a metallic silicon powder.

10. The method of claim 8, further comprising the steps of:
adjusting the Cu content of 500 to 100,000 ppm in the feed material by adding a Cu to the feed material,
adjusting the Fe content of 100 to 20,000 ppm in the feed material by adding a Fe to the feed material or selecting Fe-containing metallic silicon, and
adjusting the Al content of up to 3,000 ppm in the feed material by selecting a suitable grade of metallic silicon.

11. The method of claim 8, wherein the feed material has the Cu content of 1,000 to 100,000 ppm, Fe content of 200 to 20,000 ppm, and Al content of up to 2,000 ppm.

12. The method of claim 8, wherein the feed material has the Cu content of 800 ppm to 2.91 wt%, Fe content of 130 to 16,500 ppm, and Al content of 70 to 380 ppm.

13. The method of claim 8, further comprising steps of grinding a deposit obtained by said gas cooling to an average particle size of 0.1 to 30 μm by a grinding machine devoid of iron contamination.

* * * * *